US008914465B2

(12) United States Patent
Rubio et al.

(10) Patent No.: US 8,914,465 B2
(45) Date of Patent: Dec. 16, 2014

(54) PLATFORM SYSTEM WITH PROVIDER CONTROLLING MECHANISM AND METHOD OF OPERATION THEREOF

(75) Inventors: Ramon Rubio, Rossmoor, CA (US); Michael Constantin, Irvine, CA (US); Fatima Del Carmen Martinez, Long Beach, CA (US); Dinesh Srirangpatna, Irvine, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 283 days.

(21) Appl. No.: 13/153,284

(22) Filed: Jun. 3, 2011

(65) Prior Publication Data

US 2012/0110116 A1   May 3, 2012

Related U.S. Application Data

(60) Provisional application No. 61/407,152, filed on Oct. 27, 2010.

(51) Int. Cl.
*G06F 15/16* (2006.01)
*H04L 29/08* (2006.01)
*H04W 4/00* (2009.01)
*H04L 29/06* (2006.01)

(52) U.S. Cl.
CPC .............. *H04L 67/303* (2013.01); *H04W 4/001* (2013.01); *H04W 4/003* (2013.01); *H04L 69/24* (2013.01)
USPC ........................................................ 709/217

(58) Field of Classification Search
None
See application file for complete search history.

(56) References Cited

U.S. PATENT DOCUMENTS

| 6,470,189 | B1 * | 10/2002 | Hill et al. ................... 455/517 |
| 6,477,581 | B1 * | 11/2002 | Carpenter et al. ............ 709/238 |
| 6,574,663 | B1 * | 6/2003 | Bakshi et al. ................ 709/223 |
| 6,898,631 | B1 * | 5/2005 | Kraft et al. .................... 709/224 |
| 7,055,134 | B2 | 5/2006 | Schroeder |
| 7,383,211 | B2 | 6/2008 | Todd |
| 7,467,236 | B2 * | 12/2008 | Saito et al. ........................ 710/5 |
| 7,522,929 | B2 * | 4/2009 | Hashizume ................... 455/517 |
| 7,743,120 | B2 * | 6/2010 | Takagi ............................ 709/221 |
| 7,788,377 | B2 | 8/2010 | Itoh et al. |
| 7,945,251 | B2 * | 5/2011 | Jendbro et al. ............. 455/414.1 |
| 7,965,703 | B2 * | 6/2011 | Rieger ............................ 370/352 |
| 8,072,634 | B2 * | 12/2011 | Yanagi et al. ................ 358/1.15 |

(Continued)

FOREIGN PATENT DOCUMENTS

EP    2079197 A1    7/2009

OTHER PUBLICATIONS

OSGi Alliance; About the OSGi Service Platform; Technical Whitepaper, Revision 4.1; Jun. 7, 2007, pp. 1-20; San Ramon, California, USA.

(Continued)

*Primary Examiner* — Ninos Donabed
(74) *Attorney, Agent, or Firm* — IP Investment Law Group

(57) ABSTRACT

A method of operation of a provider controlling platform system includes: determining a provider criterion for selecting a service provider; determining a device capability for selecting a device service for a peripheral device; generating a selection threshold based on the provider criterion, the device capability, or a combination thereof for executing the device service; and generating a service command based on the selection threshold meeting or exceeding a service request for commanding the peripheral device to execute the device service.

18 Claims, 9 Drawing Sheets

(56) References Cited

U.S. PATENT DOCUMENTS

| | | | |
|---|---|---|---|
| 8,077,334 B2* | 12/2011 | Cordesses et al. | 358/1.15 |
| 8,095,643 B2* | 1/2012 | Goto et al. | 709/224 |
| 2002/0184304 A1 | 12/2002 | Meade, II et al. | |
| 2003/0074093 A1 | 4/2003 | Collazo | |
| 2005/0050555 A1* | 3/2005 | Exley et al. | 719/328 |
| 2006/0136923 A1 | 6/2006 | Kahn et al. | |
| 2008/0015823 A1 | 1/2008 | Arnold et al. | |
| 2008/0046978 A1* | 2/2008 | Rieger | 726/4 |
| 2008/0201723 A1 | 8/2008 | Bottaro et al. | |
| 2008/0243987 A1 | 10/2008 | Bodin et al. | |
| 2008/0306798 A1* | 12/2008 | Anke et al. | 705/8 |
| 2009/0022092 A1 | 1/2009 | MacInnis et al. | |
| 2010/0067407 A1* | 3/2010 | Bowen et al. | 370/271 |
| 2011/0058202 A1 | 3/2011 | St. Jacques, Jr. et al. | |
| 2011/0061055 A1 | 3/2011 | Chan | |
| 2012/0290694 A9* | 11/2012 | Marl et al. | 709/223 |

OTHER PUBLICATIONS

European Search Report for EP Application No. 11186768.5 dated Mar. 26, 2012.

* cited by examiner

PLATFORM SYSTEM WITH PROVIDER CONTROLLING MECHANISM AND METHOD OF OPERATION THEREOF

CROSS-REFERENCE TO RELATED APPLICATION(S)

This application claims the benefit of U.S. Provisional Patent Application Ser. No. 61/407,152 filed Oct. 27, 2010 and the subject matter thereof is incorporated herein by reference thereto.

TECHNICAL FIELD

The present invention relates generally to a platform system, and more particularly to a system for service architecture.

BACKGROUND ART

A platform provides a service gateway for software, hardware, and likes to interface. A service gateway may be an OSGi-compliant host server, server software installed and running on server computer hardware. "OSGi" refers to the Open Services Gateway Initiative, a computing industry organization developing specifications for service gateways, including specifications for delivery of "service bundles." OSGi service bundles are software middleware providing compliant data communications and services through service gateways. The Open Services Gateway specification is a Java™ based application layer framework that gives service provider, network operator device makers, and appliance manufacturer's vendor independent application and device layer Application Program Interface (API) and functions. An "API" is a set of routines, protocols, and tools for building software applications.

A service gateway is a separate computer coupled for data communications through a local area network or "LAN" to client devices. Client devices include any device capable of adaptation for data communications.

A service gateway usually is an embedded server inserted in a LAN not only for providing data communications among client devices, but also to connect a wide area network or "WAN," such as an external internet or extranet, to internal client devices within a home, office, or business setting. A service gateway often is an embedded server installed and running in the same physical device, cabinet or close proximity with a client device.

However, a platform system without has become a paramount concern for the consumer. The inability decreases the benefit of using the tool.

Thus, a need still remains for a platform system. In view of the increasing mobility of the workforce and social interaction, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a provider controlling platform system including: determining a provider criterion for selecting a service provider; determining a device capability for selecting a device service for a peripheral device; generating a selection threshold based on the provider criterion, the device capability, or a combination thereof for executing the device service; and generating a service command based on the selection threshold meeting or exceeding a service request for commanding the peripheral device to execute the device service.

The present invention provides a provider controlling platform system, including: a criteria module for determining a provider criterion for selecting a service provider; a capability module, coupled to the criteria module, for determining a device capability for selecting a device service for a peripheral device; a threshold module, coupled to the capability module, for generating a selection threshold based on the provider criterion, the device capability, or a combination thereof for executing the device service; and a command module, coupled to the threshold module, for generating a service command based on the selection threshold meeting or exceeding a service request for commanding the peripheral device to execute the device service.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
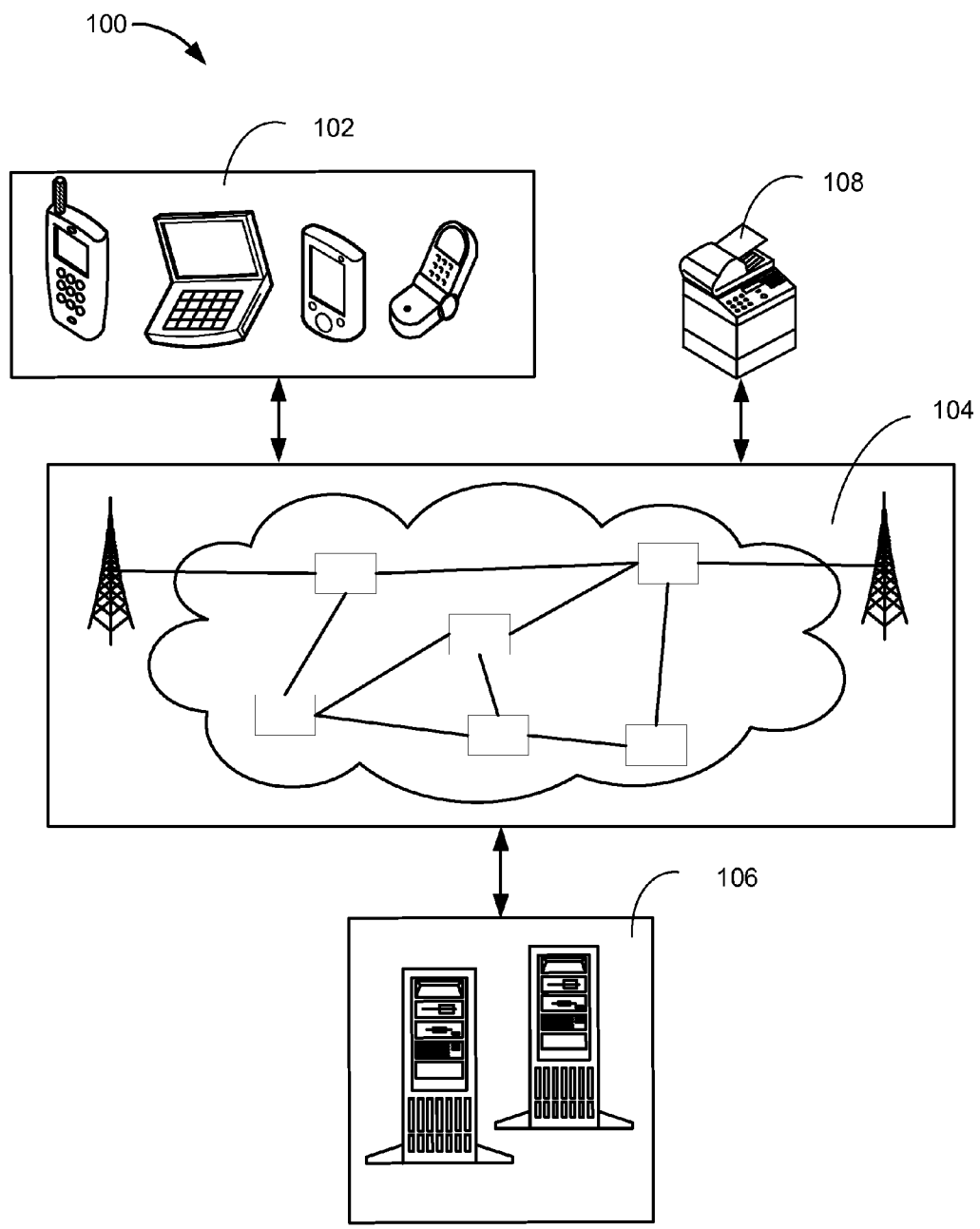
FIG. 1 is a network topology of a provider controlling platform system in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

Where multiple embodiments are disclosed and described having some features in common, for clarity and ease of illustration, description, and comprehension thereof, similar and like features one to another will ordinarily be described with similar reference numerals.

The term communication means transfer of information between software and software, hardware and hardware, software and hardware, or a combination thereof. The term communication also means transfer of information between a user, such as a human being, and a network attached device selected by the user.

The term "module" referred to herein includes software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system, passive devices, or a combination thereof.

Referring now to FIG. 1, therein is shown a network topology of a provider controlling platform system 100 in an embodiment of the present invention. The network topology of the provider controlling platform system 100 depicts a user in a mobile environment having access to devices and services at remote locations, such as home or office.

The provider controlling platform system 100 includes a first device 102, such as a mobile device, connected to a second device 106, such as a server, with a communication path 104, such as a wireless or wired network. The first device 102 is defined as a device used to communicate with the provider controlling platform system 100 to request the service provided by the present invention. The second device 106 is defined as a device that receives the request made by the first device 102 and communicates with a third device 108 to meet or exceed the request made by the first device 102.

The provider controlling platform system 100 also includes the third device 108, such as a multifunctional peripheral (MFP), connected to the second device 106 via the communication path 104. The third device 108 is defined as a device that provides the service requested by the first device 102. The MFP is defined as an electronic device having the functionality for variety of services, such as printing, scanning, photocopying, faxing, emailing, or a combination thereof.

For example, the first device 102 can be of any of a variety of mobile devices, such as a cellular phone, personal digital assistant, a notebook computer, printers or other multifunctional communication or entertainment device. For another example, the first device 102 can also be a non-mobile computing device, such as a server, a server farm, or a desktop computer. The first device 102 can couple to the communication path 104 to communicate with the second device 106.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The first device 102 can couple to the communication path 104 to communicate with the second device 106 to communicate with the third device 108.

The third device 108 can be of any of a variety of electronic devices, such as printers, fax machines, scanners, display monitors, MFPs, or other multifunctional image generating electronic devices. The third device 108 can couple to the communication path 104 to communicate with the second device 106. The second device 106 can have a means for coupling with the communication path 104 to communicate with the third device 108.

For a specific example, the first device 102 can be a particularized machine, such as a portable computing device, a thin client, a notebook, a netbook, a smartphone, personal digital assistant, or a cellular phone, and as specific examples, an Apple iPhone, Palm Centro, or Moto Q Global. In another example, the second device 106 can be a particularized machine, such as a mainframe, a server, a cluster server, rack mounted server, or a blade server, or as more specific examples, an IBM System z10 Business Class mainframe or a HP ProLiant ML server. For another example, the third device 108 can be a particularized machine, such as a printer or an MFP, and as a specific examples, Samsung CLX 3175, Canon LC MF8350, or Xerox Phaser 4180MFP/N.

The communication path 104 can be a variety of networks. For example, the communication path 104 can include wireless communication, wired communication, optical, ultrasonic, or the combination thereof. Satellite communication, cellular communication, Bluetooth, Infrared Data Association standard, wireless fidelity, and worldwide interoperability for microwave access are examples of wireless communication that can be included in the communication path 104. Ethernet, digital subscriber line, fiber to the home, and plain old telephone service are examples of wired communication that can be included in the communication path 104.

Further, the communication path 104 can traverse a number of network topologies and distances. For example, the communication path 104 can include direct connection, personal area network, local area network, metropolitan area network, wide area network or any combination thereof.

Figure 2:
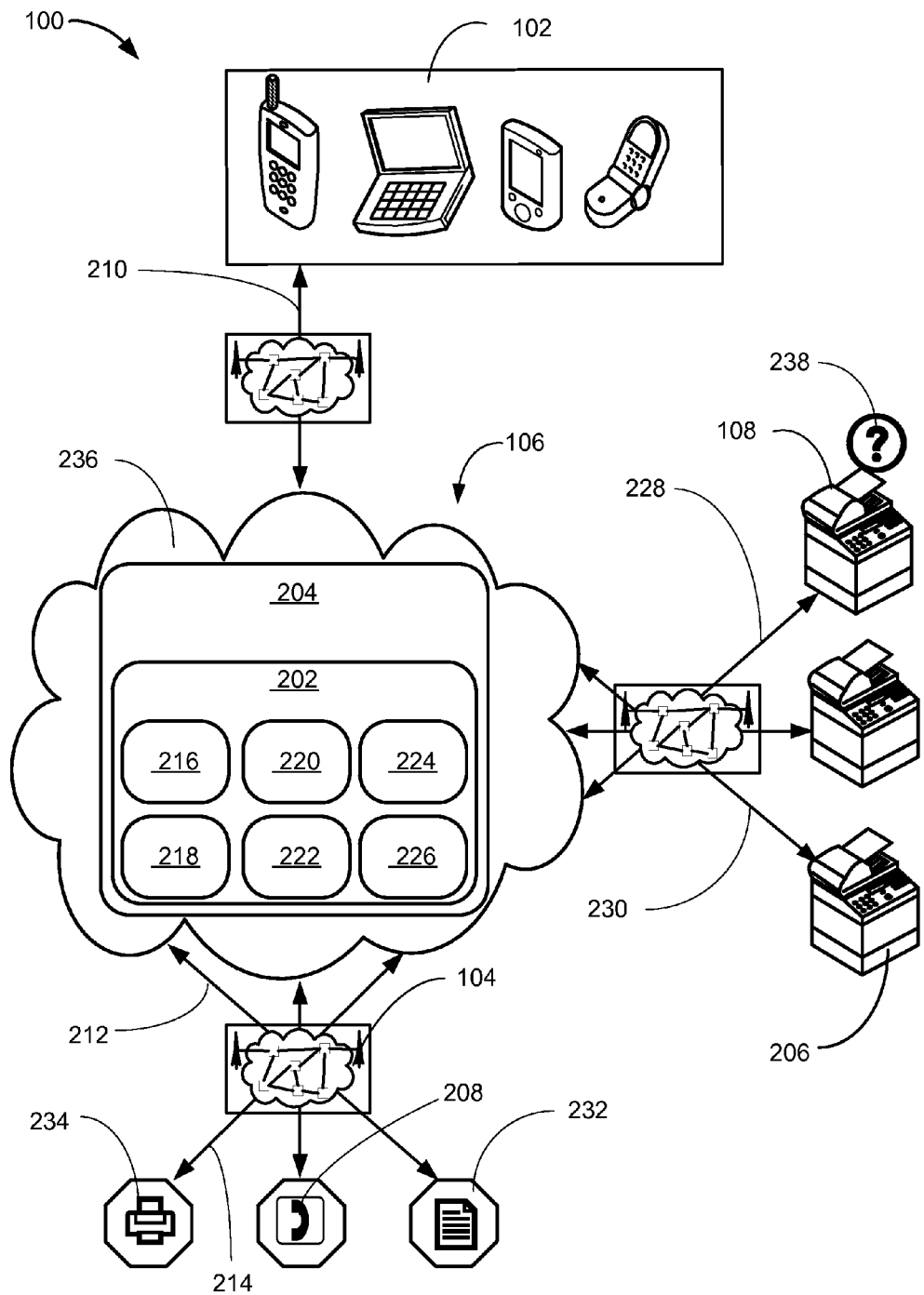
FIG. 2 is an example of the provider controlling platform system managing a selection process.

Referring now to FIG. 2, therein is shown an example of the provider controlling platform system 100 managing a selection process 202. An application environment 204 can manage the selection process 202 to select a peripheral device 206 for executing a device service 208 for meeting or exceeding a service request 210. The application environment 204 is defined as collection of a computing interface 236 that enables the management of the selection process 202. For example, the application environment 204 can include the extensible open architecture.

The computing interface 236 is defined as a point of interaction between components of the provider controlling platform system 100, such as software, hardware, or a combination thereof. For example, the computer interface can represent an application programming interface (API). The second device 106 can represent the host system that hosts the application environment 204. The host system is defined as the computing system that executes the modules of the present invention.

The selection process 202 is defined as series of steps performed by the provider controlling platform system 100 to determine the selection of the device service 208 that meets or exceeds the service request 210. The peripheral device 206 is defined as an electronic device offered by a service provider 232 that is capable of executing the device service 208 to meet or exceed the service request 210. For example, the peripheral device 206 can include a variety of electronic devices, such as an MFP, printer, scanner, fax machine, video player, audio player, or combination thereof. The peripheral device 206 can include the third device 108.

The device service 208 is defined as a function of the electronic device that can be executed by running software, hardware, or a combination thereof of the electronic device, such as processing, compressing, storing, printing, communicating, displaying, or a combination thereof of digital data. The service request 210 is defined as a demand made by the first device 102 to access the third device 108, such as the peripheral device 206, to execute the device service 208. For example, the service request 210 can request the provider controlling platform system 100 to command the peripheral device 206 to execute the device service 208 representing color printing.

The selection process 202 can include a variety of steps to determine the selection of the device service 208. For example, the selection process 202 can consider a provider criterion 212. The provider criterion 212 is defined as a rule specified by a service provider 232 that defines when the device service 208 should be selected to meet or exceed the service request 210.

The service provider 232 is defined as an entity that offers the peripheral device 206 with the device service 208 who registers the provider criterion 212 with the provider controlling platform system 100. For example, the service provider 232 can communicate via the communication path 104 to submit the provider criterion 212 to register when the device service 208 can be executed on the provider controlling platform system 100. In this example depicted in FIG. 2, the provider controlling platform system 100 can communicate with three of the service provider 232.

The provider criterion 212 can include a variety of conditions to trigger the selection of the device service 208. For example, the provider criterion 212 can define the selection of the device service 208 based on a manufacturer of the peripheral device 206. For example, the manufacturer can represent the maker of the electronic devices, such as Canon™, Samsung™, or Xerox™. For a specific example, the provider criterion 212 can define that only the peripheral device 206 manufactured by Canon™ can meet the service request 210. Although the peripheral device 206 manufactured by others is also available to execute the device service 208 to meet the service request 210, the provider criterion 212 can restrict the selection of the device service 208 for the peripheral device 206 manufactured by Canon™ to meet or exceed the service request 210.

For a different example, the provider criterion 212 can define the selection of the device service 208 based on a device status 238. The device status 238 is defined as a state or condition of the peripheral device 206. For a specific example, the provider criterion 212 can define that if the device service 208 representing printing for the peripheral device 206 representing an MFP in the first floor copy room is unavailable, then the peripheral device 206 representing a printer in the second floor break room will be selected to meet the service request 210 for printing.

The selection process 202 can consider a device capability 214 to determine if the peripheral device 206 should be selected to meet or exceed the service request 210. The device capability 214 is defined as an ability of the peripheral device 206 to perform a particular function. The ability of the peripheral device 206 can represent the device service 208, such as processing, compressing, storing, printing, communicating, displaying, or a combination.

For example, the peripheral device 206 can be a fax machine and the device capability 214 can be faxing documents. The service request 210 is for printing documents. Based on the device capability 214, the peripheral device 206 will not be selected to meet the service request 210.

The selection process 202 can include a platform criterion 216. The platform criterion 216 is defined as a rule specified by the application environment 204 that defines when the device service 208 should be selected to meet or exceed the service request 210.

The platform criterion 216 can include a variety of conditions to trigger the selection of the device service 208. For example, the platform criterion 216 can define the selection of the device service 208 based on an execution order 218. The execution order 218 is defined as the order of priority for selecting the multiple numbers of the service provider 232 to execute the device service 208 for meeting or exceeding the service request 210. For example, the execution order 218 can prioritize the execution of the device service 208 offered by the service provider 232 located in South Korea before the execution of the device service 208 offered by the service provider 232 located in China.

For a different example, the platform criterion 216 can define the selection of the device service 208 based on a set of inputs. For example, the set of inputs can include the multiple numbers of the service request 210 made by multiple numbers of the first device 102. If the number of the service request 210 and the number of the first device 102 making the service request 210 exceeds a predefined threshold, the platform criterion 216 can trigger the provider controlling platform system 100 to activate the peripheral device 206 with the device status 238 of idle to meet or exceed the service request 210.

For another example, the provider criterion 212 can designate the execution of the device service 208 for the peripheral device 206 manufactured by a particular manufacturer. For a specific example, the provider criterion 212 can designate the execution of the device service 208 for the peripheral device 206 manufactured by Canon™.

However, the platform criterion 216 can prioritize the manufacturer specified in the service request 210. For example, the service request 210 seeks the device service 208 of the peripheral device 206 manufactured by Samsung™. The platform criterion 216 can override the provider criterion 212 and permit the provider controlling platform system 100 to execute the device service 208 of the peripheral device 206 manufactured by Samsung™.

The selection process 202 can include a selection threshold 220. The selection threshold 220 is defined as the condition required by the provider controlling platform system 100 to select the device service 208 for meeting or exceeding the service request 210. The selection threshold 220 can be generated by a variety of combinations of inputs, such as the provider criterion 212, the device capability 214, or a combination thereof.

For example, the selection threshold 220 can include the device capability 214 representing color printing and the provider criterion 212 representing the peripheral device 206 manufactured by Xerox™. The service request 210 seeks the peripheral device 206 to execute the device service 208 representing a black monochrome printing. Because the selection threshold 220 does not meet the service request 210, the provider controlling platform system 100 cannot command the peripheral device 206 manufactured by Xerox™ to execute the device service 208.

In a different example, the service request 210 seeks color printing by the peripheral device 206 manufactured by any of the manufacturer. Because the selection threshold 220 exceeds the service request 210, the provider controlling platform system 100 can generate a service command 230 to command the peripheral device 206 to execute the device service 208. The service command 230 is defined as the demand made by the provider controlling platform system 100 to the peripheral device 206 for executing the device service 208 to meet or exceed the service request 210.

Continuing with the previous example, if the selection threshold 220 fails to meet the service request 210, the provider controlling platform system 100 can execute a default service 234 to respond to the service request 210. The default service 234 is defined as the device service 208 provided when the selection threshold 220 fails to meet the service request 210.

For example, the service request 210 seeks the color printing of documents. However, the device capability 214 is limited to black and white printing. The default service 234 can represent black and white printing. The provider controlling platform system 100 can execute the default service 234 to respond to the service request 210 to print documents black and white printing.

The selection process 202 can consider a device configuration 222. The device configuration 222 is defined as the properties of the peripheral device 206 for registering the peripheral device 206 to the provider controlling platform system 100. The property of the peripheral device 206 is defined as the makeup of the peripheral device 206, such as the device capability 214 of the peripheral device 206, manufacturer of the peripheral device 206, information related to the service provider 232, or a combination thereof.

The selection process 202 can include a service listing 224. The service listing 224 is defined as the compilation of the device service 208, the peripheral device 206, the service provider 232, or a combination thereof registered to the provider controlling platform system 100 that are available for the first device 102 to make the service request 210. For example, the service listing 224 can include the device service 208 offered by each of the service provider 232. For another example, the service listing 224 can include the peripheral device 206 offered by each of the service provider 232.

The selection process 202 can include a collection criterion 226. The collection criterion 226 is defined as the rule specified by the provider controlling platform system 100 to collect a command result 228 for executing the service command 230. The command result 228 is defined as the effect from executing the service command 230.

The collection criterion 226 can include a variety of conditions to trigger the collection of the command result 228. For example, the collection criterion 226 can define the collection of the command result 228 for meeting or exceeding the service request 210 for printing documents. For another example, the collection criterion 226 can define the collection of the command result 228 for executing the device service 208 offered by one the service provider 232. For a different example, the collection criterion 226 can define the collection of the command result 228 for failing to meet the service request 210, but responding to the service request 210 by executing the default service 234.

It has been discovered that the present invention provides the selection process 202 with the ability to consider multiple factors to command the execution of the devise service 208 automatically and dynamically for meeting or exceeding the service request 210. More specifically, the consideration of the platform criterion 216, the selection threshold 220, or the combination thereof by the selection process 202 improves efficiency and productivity for the provider controlling platform system 100 to meet or exceed the service request 210. As a result, the sender of the service request 210 can expect the execution of the device service 210 that is best suited with minimal involvement in selecting the device service 208.

Figure 3:
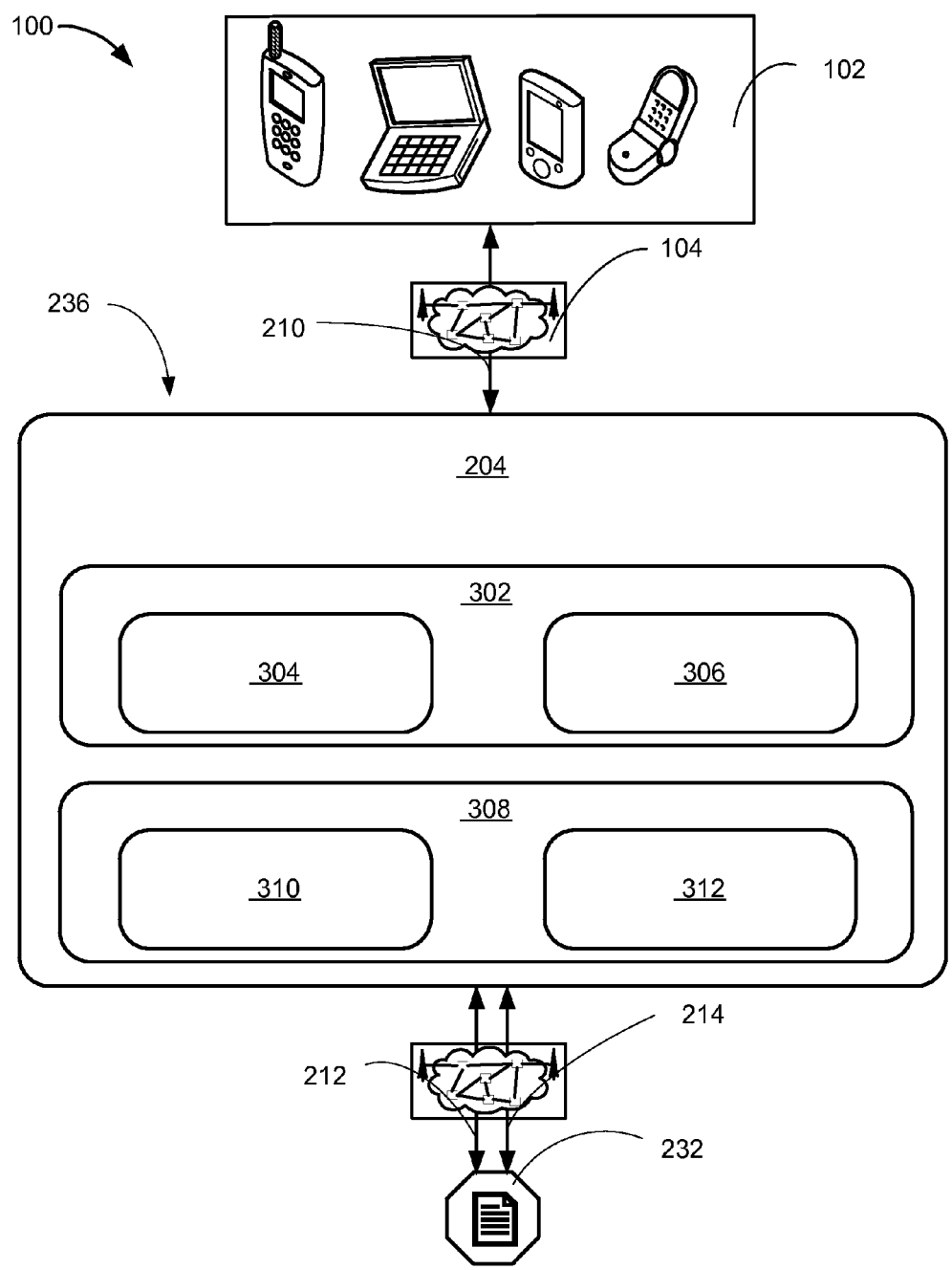
FIG. 3 is an example of the computing interface of the application environment interacting with the first device and the service provider.

Referring now to FIG. 3, therein is shown an example of the computing interface 236 of the application environment 204 interacting with the first device 102 and the service provider 232. The first device 102 and the service provider 236 can communicate with the computing interface 236 via the communication path 104.

The computing interface 236 can include a client interface 302. The client interface 302 is defined as a point of interaction between the provider controlling platform system 100 and the first device 102. Furthermore, the provider controlling platform system 100 can provide the APIs for the first device 102 to send the service request 210 to access the peripheral device 206 for executing the device service 208 of FIG. 2. The client interface 302 can include a client framework interface 304 and a client service interface 306.

The client framework interface 304 is defined as the point of interaction between the first device 102 and the service provider 232 registered to the provider controlling platform system 100. The client service interface 306 is defined as the point of interaction between the first device 102 and the device service 208 of FIG. 2. Details regarding the client framework interface 304 and the client service interface 306 will be discussed later.

The computing interface 236 can include a provider interface 308. The provider interface 308 is defined as the point of interaction between the provider controlling platform system 100 and the service provider 232. Furthermore, the provider interface 308 provides the APIs for the service provider 232 to define provider criterion 212, the device capability 214, or a combination thereof to the provider controlling platform system 100. The provider interface 308 can include a provider framework interface 310 and a provider service interface 312.

The provider framework interface 310 is defined as the point of interaction between the service provider 232 and the provider controlling platform system 100 where the service provider 232 can access the APIs provided by the provider controlling platform system 100. The provider service interface 312 is defined as the point of interaction between the service provider 232 and the provider controlling platform system 100 where the service provider 232 can expand the APIs for the provider controlling platform system 100 based on registering the provider criterion 212, the device capability 214, or a combination thereof.

The application environment 204 can conceal the APIs available in the provider interface 308 from the user of the first device 102. In contrast, the service provider 232 has visibility to the APIs available in the client interface 302 and the provider interface 308. The details regarding the provider framework interface 310 and the provider service interface 312 will be discussed later.

Figure 4:
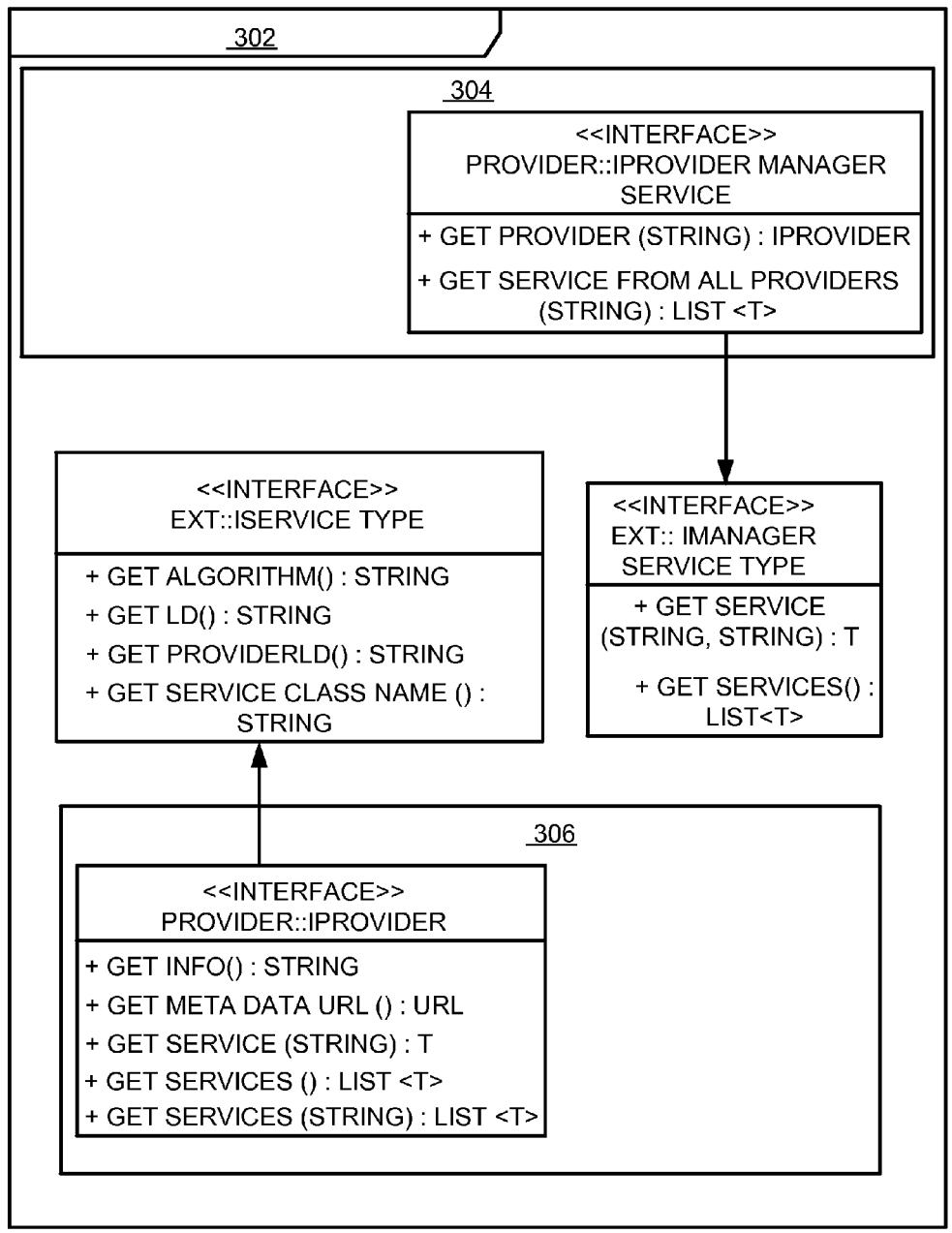
FIG. 4 is an example of the client interface.

Referring now to FIG. 4, therein is shown an example of the client interface 302. The client interface 302 can include APIs for the first device 102 of FIG. 1 to access the service provider 232 of FIG. 2, the device service 208 of FIG. 2, or the combination thereof registered to the provider controlling platform system 100.

For example, the client framework interface 304 can include the IProviderManagerService. The first device 102 can access the device service 208 by interfacing with the APIs for IProviderManagerService to access the device service 208 registered to the provider controlling platform system 100 for all of the service provider 232. Furthermore, the first device 102 can interface with IProviderManagerService to discover the service provider 232 registered to the provider controlling platform system 100.

For another example, the client service interface 306 can include the IProvider. The first device 102 can access the device service 208 by interface with the APIs for IProvider to access the device service 208 registered by the service provider 232 individually.

Figure 5:
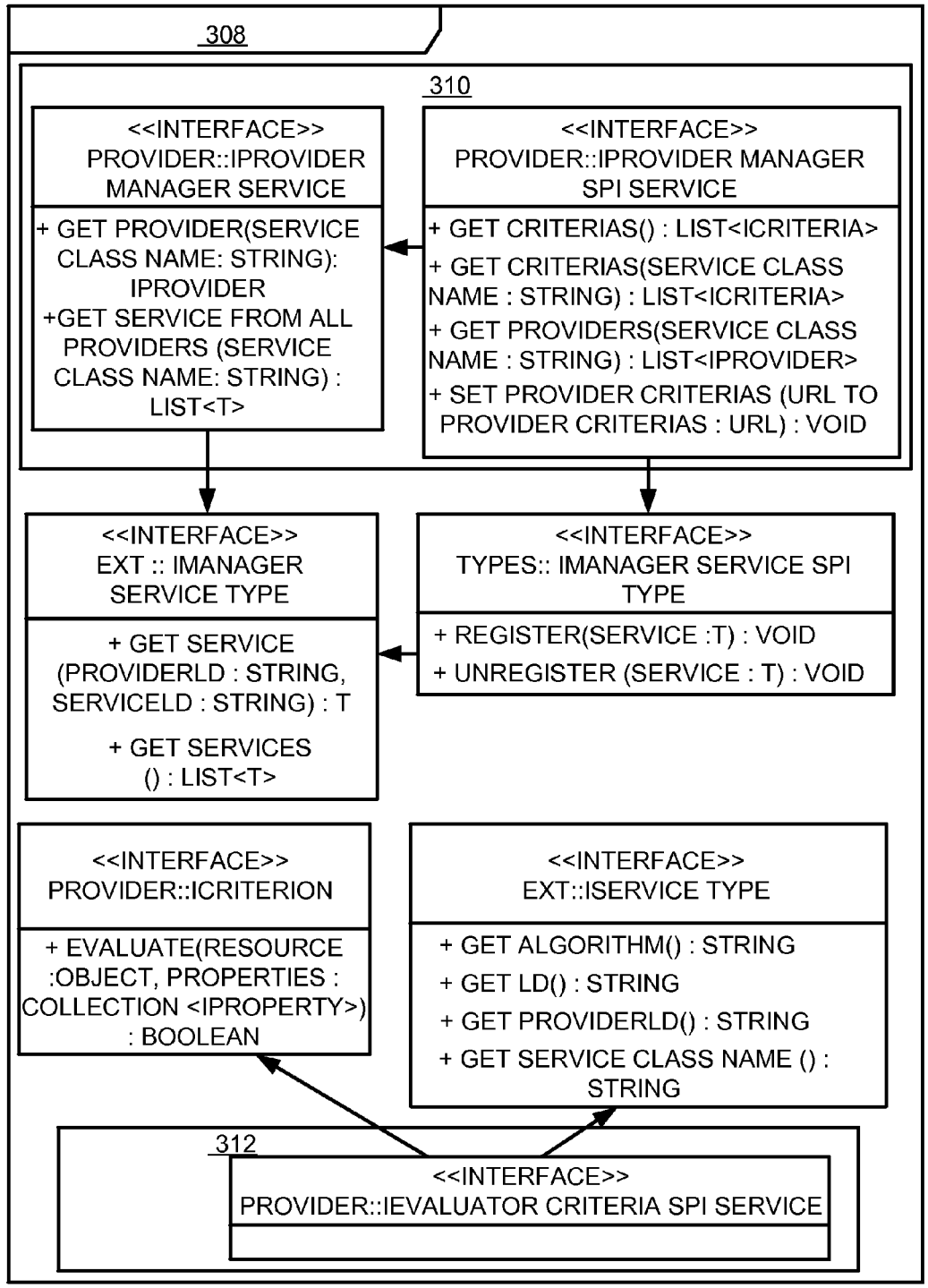
FIG. 5 is an example of the provider interface.

Referring now to FIG. 5, therein is shown an example of the provider interface 308. The provider interface 308 can include APIs to register the provider criterion 212 of FIG. 2, the device capability 214 of FIG. 2, or a combination thereof by the service provider 232 of FIG. 2.

For example, the provider frame work interface 310 can include IProviderManagerSpiService to register or unregister the service provider 232 from the provider controlling platform system 100. Furthermore, the service provider 232 can interface with IProviderManagerSpiService to access the provider criterion 212 registered on the provider controlling platform system 100.

For another example, the provider service interface 312 can include the IEvaluatorCriteriaSpiService. The service provider 232 can specify the provider criterion 212 by interfacing with the APIs for IEvaluatorCriteriaSpiService to the provider controlling platform system 100.

Figure 6:
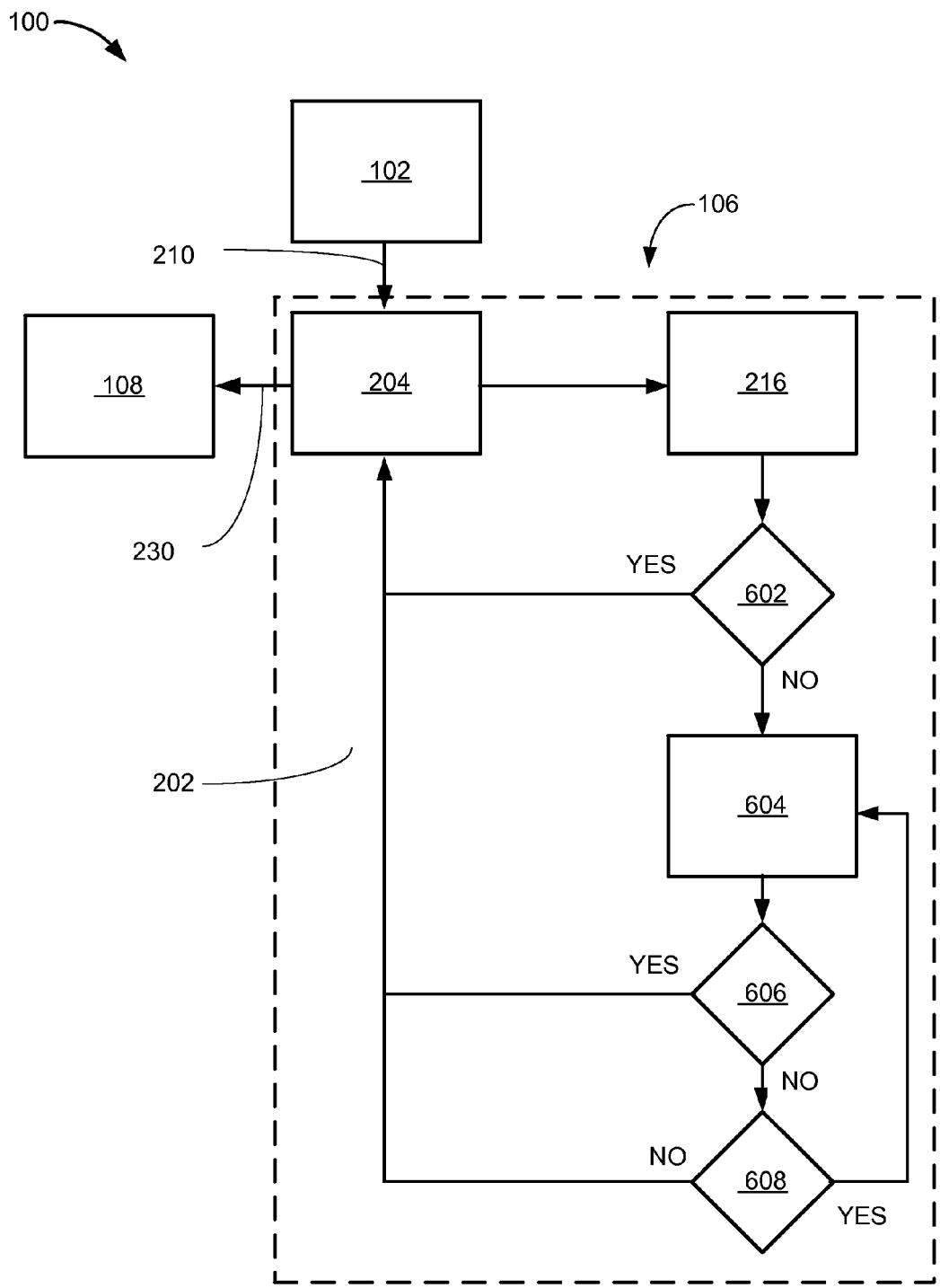
FIG. 6 is an example of the selection process for selecting the device service of FIG. 2 to meet or exceed the service request.

Referring now to FIG. 6, therein is shown an example of the selection process 202 for selecting the device service 208 of FIG. 2 to meet or exceed the service request 210. The selection process 202 can be represented by a logical block representing elements introduced in FIG. 2. The logical sequence is also represented by a first decision block 602, a second decision block 606, and a third decision block 608. The first decision block 602, the second decision block 606, and the third decision block 608 can determine which sequence will follow after each of the decision blocks results in "Yes" or "No" result.

For example, the first device 102 can send the service request 210 for the device service 208 of FIG. 2 to the second device 106. The application environment 204, represented by a logical block, can receive the service request 210 to determine whether the provider controlling platform system 100 can meet or exceed the service request 210.

The application environment 204 can first consider the platform criterion 216 represented in a logical block. If the rules set by the platform criterion 216 are met, the result to the first decision block 602 will be a "Yes." Subsequently, the device service 208 designated by the platform criterion 216 will be returned to the application environment 204. The application environment 204 can generate the service command 230 to command the third device 108 to execute the device service 208 designated by the platform criterion 216.

However, if the rules set by the platform criterion 216 are not met, the result to the first decision block 602 will be a "No." Subsequently, the logical sequence will move on to a provider logical block 604. The provider logical block 604 is defined as the logical block that represents the provider criterion 212 of FIG. 2, the device capability 214 of FIG. 2, or a combination thereof defined by the service provider 232 of FIG. 2. Additionally, the provider logical block 604 can include more than one of the service provider 232 defining the provider criterion 212 and the device capability 214.

The application environment 204 can next consider whether the selection threshold 220 of FIG. 2 representing the provider criterion 212 the device capability 214, or a combination thereof is met in the second decision block 606. If the selection threshold 220 is met, the result to the second decision block 606 will be a "Yes." Subsequently, the device service 208 designated by the provider criterion 212 will be returned to the application environment 204. The application environment 204 can generate the service command 230 to command the third device 108 to execute the device service 208.

However, if the selection threshold 220 is not met, the result to the second decision block 606 will be a "No." Subsequently, the logical sequence will move on to the third decision block 608 to determine whether the provider controlling platform system 100 includes more of the service provider 232 to consider other of the provider criterion 212, the device capability 214, or a combination thereof.

If the provider controlling platform system 100 is not registered with more of the service provider 232, the default service 234 of FIG. 2 can be returned to the application environment 204. The application environment 204 can generate the service command 230 to command the third device 108 to execute the default service 234 to respond to the service request 210.

However, if the provider controlling platform system 100 is registered with more of the service provider 232, the logical sequence returns to the provider logical block 604. The provider controlling platform system 100 can consider other of the selection threshold 220 that includes the provider criterion 212 the device capability 214, or a combination defined by other of the service provider 232.

If the selection threshold 220 is met, the result to the second decision block 606 will be a "Yes." Subsequently, the device service 208 provided by the other of the service provider 232 can be returned to the application environment 204. The application environment 204 can generate the service command 230 to command the third device 108 to execute the device service 208 defined by the other of the service provider 232 to meet or exceed the service request 210.

However, if the selection threshold 220 is not met, the result to the second decision block 606 will be a "No." Subsequently, the logical sequence will move on to the third decision block 608.

Figure 7:
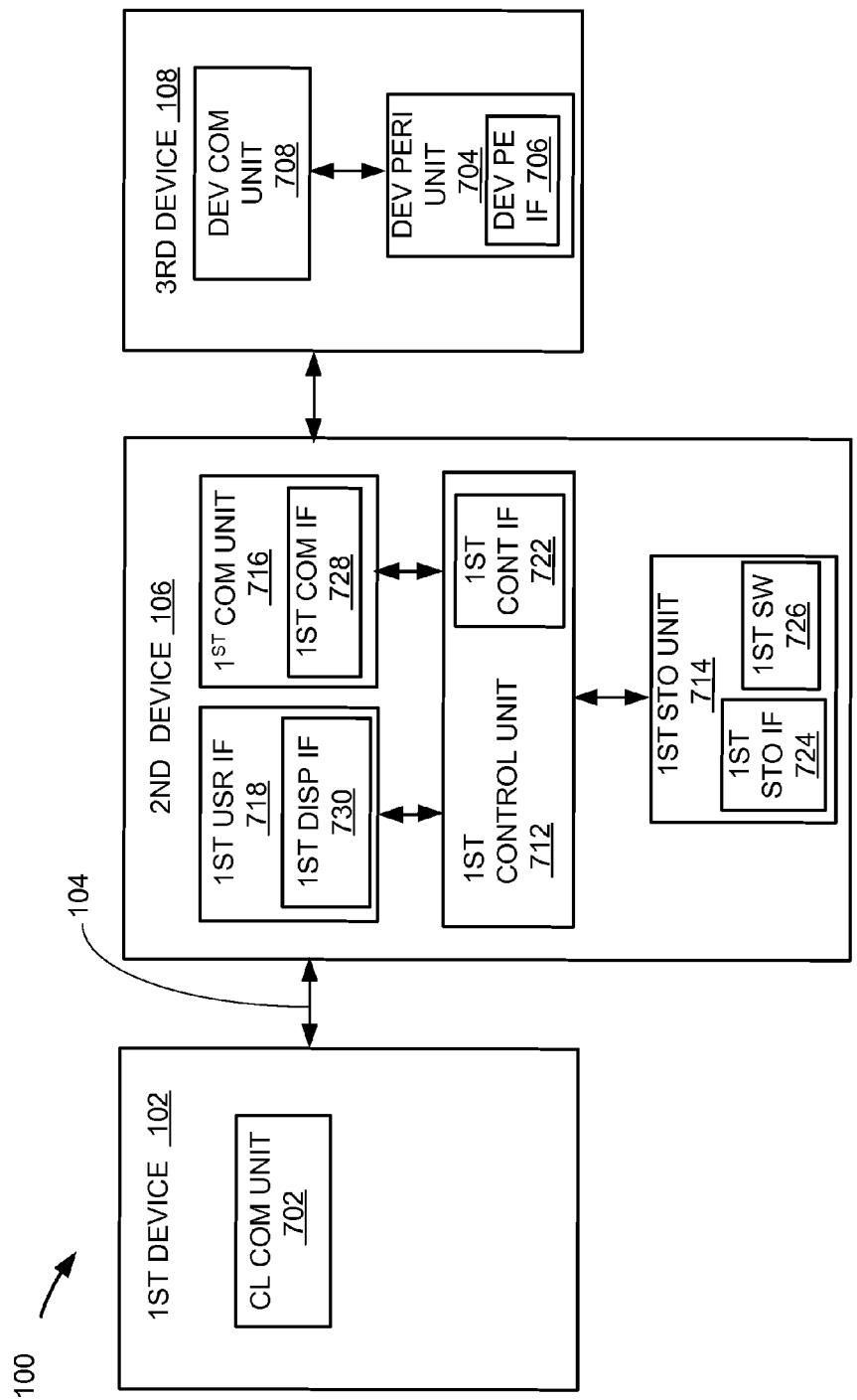
FIG. 7 is an exemplary block diagram of the provider controlling platform system.

Referring now to FIG. 7, therein is shown an exemplary block diagram of the provider controlling platform system 100. The provider controlling platform system 100 can include the first device 102, the communication path 104, the second device 106, and the third device 108. The first device 102 can send information over the communication path 104 to the second device 106. The second device 106 can send information over the communication path 104 to the first device 102. The second device 106 can send information over the communication path 104 to the third device 108. The third device 108 can send information over the communication path 104 to the second device 106.

For brevity of description in this embodiment of the present invention, the first device 102 will be described as a mobile device, the second device 106 will be described as a server device, and the third device 108 will be described as the peripheral device 206 of FIG. 2. The present invention is not limited to this selection for the type of devices. The selection is an example of the present invention.

The first device 102 can include a client communication unit 702. The client communication unit 702 can enable external communication to and from the first device 102. For example, the client communication unit 702 can permit the first device 102 to communicate with the second device 106, an attachment, such as an electronic device, and the communication path 104. The client communication unit 702 can send the service request 210 of FIG. 2.

The second device 106 can include a first control unit 712, a first storage unit 714, a first communication unit 716, and a first user interface 718. The first control unit 712 can include a first control interface 722. The first control unit 712 can execute a first software 726 to provide the intelligence of the provider controlling platform system 100. The intelligence of the provider controlling platform system 100 is defined as the ability to execute the modules of the provider controlling platform system 100. The first control unit 712 can be implemented in a number of different manners. For example, the first control unit 712 can include a processor, an embedded processor, a microprocessor, a hardware control logic, a hardware finite state machine, a digital signal processor, or a combination thereof. The first control interface 722 can be used for communication between the first control unit 712 and other functional units in the second device 106. The first control interface 722 can also be used for communication that is external to the second device 106.

The first control interface 722 can receive information from the other functional units or from external sources, or can transmit information to the other functional units or to external destinations. The external sources and the external destinations refer to sources and destinations external to the second device 106.

The first control interface 722 can be implemented in different ways and can include different implementations depending on which functional units or external units are being interfaced with the first control interface 722. For example, the first control interface 722 can be implemented with a pressure sensor, an inertial sensor, a microelectromechanical system, optical circuitry, waveguides, wireless circuitry, wireline circuitry, or a combination thereof.

The first storage unit 714 can store the first software 726. The first storage unit 714 can also store the relevant information, such as advertisements, points of interest, social network entries, or any combination thereof.

The first storage unit 714 can be a volatile memory, a nonvolatile memory, an internal memory, an external memory, or a combination thereof. For example, the first storage unit 714 can be a nonvolatile storage such as nonvolatile random access memory, Flash memory, disk storage, or a volatile storage such as static random access memory.

The first storage unit 714 can include a first storage interface 724. The first storage interface 724 can be used for communication between other functional units in the first device 102. The first storage interface 724 can also be used for communication that is external to the second device 106.

The first storage interface 724 can receive information from the other functional units or from external sources, or can transmit information to the other functional units or to external destinations. The external sources and the external destinations refer to sources and destinations external to the second device 106.

The first storage interface 724 can include different implementations depending on which functional units or external units are being interfaced with the first storage unit 714. The first storage interface 724 can be implemented with technologies and techniques similar to the implementation of the first control interface 722.

The first communication unit 716 can enable external communication to and from the second device 106. For example, the first communication unit 716 can permit the first device 102 to communicate with the second device 106 and the communication path 104. For another example, the first communication unit 716 can permit the second device 106 to communicate with the third device 108 and the communication path 104.

The first communication unit 716 can also function as a communication hub allowing the second device 106 to function as part of the communication path 104 and not limited to be an end point or terminal unit to the communication path 104. The first communication unit 716 can include active and passive components, such as microelectronics or an antenna, for interaction with the communication path 104.

The first communication unit 716 can include a first communication interface 728. The first communication interface 728 can be used for communication between the first communication unit 716 and other functional units in the second device 106. The first communication interface 728 can receive information from the other functional units or can transmit information to the other functional units.

The first communication interface 728 can include different implementations depending on which functional units are being interfaced with the first communication unit 716. The first communication interface 728 can be implemented with technologies and techniques similar to the implementation of the first control interface 722.

The first user interface 718 allows a user to interface and interact with the second device 106. The first user interface 718 can include an input device and an output device. Examples of the input device of the first user interface 718 can include a keypad, a touchpad, soft-keys, a keyboard, a microphone, or any combination thereof to provide data and communication inputs.

The first user interface 718 can include a first display interface 730. The first display interface 730 can include a display, a projector, a video screen, a speaker, or any combination thereof.

The first control unit 712 can operate the first user interface 718 to display information generated by the provider controlling platform system 100. The first control unit 712 can also execute the first software 726 for the other functions of the provider controlling platform system 100, including receiving the service request 210 from the first communication unit 716. The first control unit 712 can further execute the first software 726 for interaction with the communication path 104 via the first communication unit 716.

The third device 108 can include a device peripheral unit 704, a device peripheral interface 706, and a device communication unit 708. The device peripheral unit 704 can execute the device service 208 of FIG. 2 in response to the service command 230 of FIG. 2 requested by the application environment 204 of FIG. 2. The device peripheral unit 704 can be implemented in many ways. For example, the device peripheral unit 704 can function as a printer, fax machine, a scanner, a display monitor, or a combination thereof.

The device peripheral unit 704 can include the device peripheral interface 706. The device peripheral interface 706 can be used for communication between the device peripheral unit 704 and other functional units in the third device 108. The device peripheral interface 706 can also be used for communication that is external to the third device 108.

The device peripheral interface 706 can receive information from the other functional units or from external sources, or can transmit information to the other functional units or to external destinations. The external sources and the external destinations refer to sources and destinations external to the third device 108.

The device peripheral interface 706 can include different implementations depending on which functional units or external units are being interfaced with the device peripheral unit 704. The device peripheral interface 706 can be implemented with technologies and techniques similar to the implementation of the first control interface 722.

The device communication unit 708 can enable external communication to and from the third device 108. For example, the device communication unit 708 can permit the third device 108 to communicate with the second device 106, an attachment, such as an electronic device or a computer desktop, and the communication path 104. The device communication unit 708 can send the command result 228 of FIG. 2, can receive the service command 230 of FIG. 2, or a combination thereof.

Figure 8:
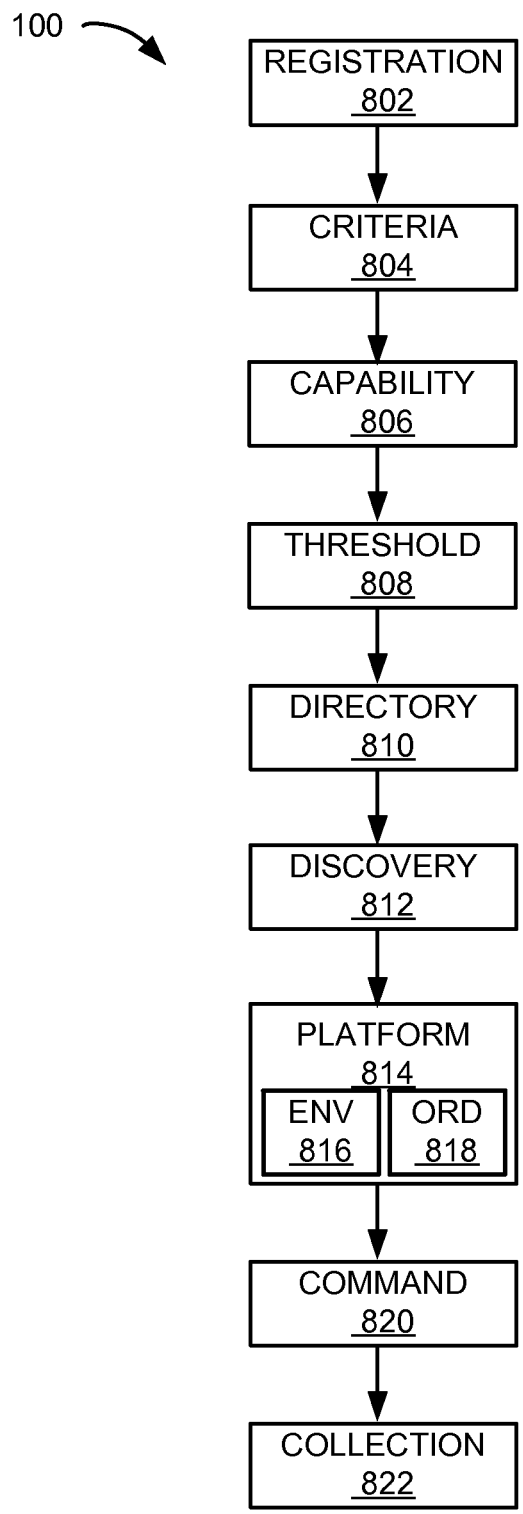
FIG. 8 is a control flow of the provider controlling platform system.

Referring now to FIG. 8, therein is shown a control flow of the provider controlling platform system 100. The provider controlling platform system 100 can include a registration module 802. The registration module 802 registers the service provider 232 of FIG. 2 and the peripheral device 206 of FIG. 2 offered to execute the device service 208 of FIG. 2. For example, the registration module 802 can receive the device configuration 222 of FIG. 2 for registering the service provider 232. For a more specific example, the registration module 802 can include the provider interface 308 of FIG. 3 for the service provider 232 to register the device service 208.

The registration module 802 can register the service provider 232 in a number of ways. For example, the registration module 802 can receive the device configuration 222. The device configuration 222 can be represented by an Extensible Markup Language (XML).

The registration module 802 can register the service provider 232 by placing the device configuration 222 under the system directory of the provider controlling platform system 100. The system directory is defined as the file system for the provider controlling platform system 100 that contains executable files, Java Archive (JAR) files, or a combination thereof.

For example, the system directory can represent a META-INF directory. META-INF directory is defined as a system directory that contains JAR files. For a specific example, the device configuration 222 can be represented as a JAR file. By placing the device configuration 222 under the META-INF folder, the registration module 802 can register the device service 208, the peripheral device 206, the service provider 232, or a combination thereof to the application environment 204 of FIG. 2 of the provider controlling platform system 100.

For an example of an XML file, provider.meta-data.xml can provide the details of the device configuration 222:

```
<?xml version="1.0" encoding="UTF-8"?>
<!-- edited with XMLSpy v2007 rel. 3 sp1 -->
<xs:schemaxmlns:xoa-s-provider="http://www.samsung.com/schema/xoa-s/provider"
xmlns:xs="http://www.w3.org/2001/XMLSchema"targetNamespace="http://www.sa
msung.com/schema/xoa-s/provider" elementFormDefault="qualified"
attributeFormDefault="unqualified">
    <xs:include schemaLocation="provider.common.types.xsd"/>
    <xs:element name="provider">
        <xs:annotation>
            <xs:documentation>Provider Meta-Data XML
Representation</xs:documentation>
        </xs:annotation>
        <xs:complexType>
            <xs:sequence>
                <xs:element name="providerInfo" type="xs:string"
minOccurs="0">
                    <xs:annotation>
    <xs:documentation>Descriptionassociated with Provider.</xs:documentation>
                    </xs:annotation>
                </xs:element>
                <xs:element name="references" minOccurs="0">
                    <xs:annotation>
                        <xs:documentation>List of references
that are used to describe when a particular service should be
used.</xs:documentation>
                    </xs:annotation>
                    <xs:complexType>
                        <xs:sequence>
    <xs:elementname="reference"type="xoa-s-provider:referenceType"
maxOccurs="unbounded"/>
                        </xs:sequence>
                    </xs:complexType>
                </xs:element>
                <xs:element name="service" type="xoa-s-
provider:serviceType" maxOccurs="unbounded">
                    <xs:annotation>
                        <xs:documentation>Service
implemented by provider. Defines capabilities of service.</xs:documentation>
                    </xs:annotation>
                </xs:element>
            </xs:sequence>
            <xs:attribute name="id" type="xs:string" use="required">
                <xs:annotation>
                    <xs:documentation>Unique id of provider. Id
must be unique throughout entire XOA-S Product Environment.</xs:documentation>
                </xs:annotation>
            </xs:attribute>
        </xs:complexType>
    </xs:element>
    <xs:complexType name="propertyType">
        <xs:attribute name="propertyId" type="xs:string" use="required"/>
```

```
        </xs:complexType>
        <xs:complexType name="referenceType">
            <xs:sequence>
                <xs:element name="property" type="xoa-s-
provider:propertyType" minOccurs="0" maxOccurs="unbounded">
                    <xs:annotation>
                        <xs:documentation>list of properties that may
be supported by provider. if none are listed then it is assumed that provider supports
all properties associated with resource</xs:documentation>
                    </xs:annotation>
                </xs:element>
                <xs:element name="criteria" type="xoa-s-
provider:criteriaType" minOccurs="0">
                    <xs:annotation>
                        <xs:documentation>Optional list of criteria for
when a provider and service should be used. NOTE: Service is optional and does not
need to be specified.</xs:documentation>
                    </xs:annotation>
                </xs:element>
            </xs:sequence>
            <xs:attribute name="referenceId" type="xs:string" use="required">
                <xs:annotation>
                    <xs:documentation>id used to reference
reference.</xs:documentation>
                </xs:annotation>
            </xs:attribute>
            <xs:attribute name="resourceClassName" type="xs:string"
use="required">
                <xs:annotation>
                    <xs:documentation>resource class name of resource
being acted on by service.</xs:documentation>
                </xs:annotation>
            </xs:attribute>
        </xs:complexType>
        <xs:complexType name="serviceType">
            <xs:attribute name="id" type="xs:string" use="required"/>
            <xs:attribute name="serviceClassName" type="xs:string"
use="required"/>
            <xs:attribute name="primary" type="xs:boolean" use="optional"
default="true"/>
            <xs:attribute name="ref" type="xs:string" use="optional"/>
            <xs:attribute name="algorithm" type="xs:string" use="optional"/>
        </xs:complexType>
        <xs:complexType name="criteriaType">
            <xs:sequence>
                <xs:choice>
                    <xs:element name="scriptCriterion" type="xoa-s-
provider:scriptType">
                        <xs:annotation>
                            <xs:documentation>In line script that
should be executed to perform evaluation of criteria. Script shall implement a set
interface similar to OSGi service. This interface will be called during evaluation
process. ONLY one try of this kind may exist within criteria.</xs:documentation>
                        </xs:annotation>
                    </xs:element>
                    <xs:element name="osgiServiceCriterion" type="xoa-s-
provider:osgiServiceType">
                        <xs:annotation>
                            <xs:documentation>OSGi service that
will be called to evaluate criteria. Must implement ICustomCriteria interface. Only
ONE entry of this kind may exist within a criteria.</xs:documentation>
                        </xs:annotation>
                    </xs:element>
                </xs:choice>
            </xs:sequence>
        </xs:complexType>
</xs:schema>
```

For another example, the registration module 802 can register the service provider 232 through the Spring Dynamic Module (spring-dm) for Open Services Gateway initiative (OSGi) framework. For a specific example, the registration module 802 can register the device service 208 offered by the service provider 232 through the service registry of the OSGi framework.

It has been discovered that the present invention provides the service provider 232 with the flexibility to add and subtract the device service 208 offered on the provider controlling platform system 100. The service provider 232 can define the provider criterion 212 to change the device service 208 made available. Furthermore, the ability to define the provider criterion 212 for when the device service 208 should be executed offers the service provider 232 with the flexibility to control the provider controlling platform system 100. This control provides incentives for the service provider 232 to define the provider criterion 220 212 that is best suited to the consumer of the device service 208. As a result, the flexibility allows the provider controlling platform system 100 to keep abreast with the changes in the volume and the nature of the service request 210, thus, improving efficiency and productivity for executing the device service 208.

The provider controlling platform system 100 can include a criteria module 804. The criteria module 804 determines the rules designated by the service provider 232 for accessing the peripheral device 206. For example, the criteria module 804 can determine the provider criterion 212 of FIG. 2 for selecting the service provider 232.

The criteria module 804 can determine the provider criterion 212 in a number of ways. For example, the criteria module 804 can determine the device capability 214 by parsing the provider.meta-data.xml. More specifically, the provider.meta-data.xml can include the provider criterion 212 to control when the device service 208 should be selected to meet or exceed the service request 210. For another example, the criteria module 804 can determine the provider criterion 212 by specifying the rules using Scripting language, OSGi Service, Structured Query Language (SQL), or a combination thereof.

The provider controlling platform system 100 can include a capability module 806. The capability module 806 determines the functionalities available for the peripheral device 206 to allow the first device 102 of FIG. 2 to send the service request 210 for executing the device service 208. For example, the capability module 806 can determine the device capability 214 of FIG. 2 for selecting the device service 208 for the peripheral device 206.

The capability module 806 can determine the device capability 214 in a number of ways. For example, the capability module 806 can determine the device capability 214 by parsing the provider.meta-data.xml. More specifically, the provider.meta-data.xml can include the device service 208 for the peripheral device 206. For a specific example, the provider.meta-data.xml can include that an MFP manufactured by Samsung™ can include printing, faxing, and scanning. The capability module 806 can determine that the device capability 214 for the peripheral device 206 includes printing, faxing, and scanning.

For another example, the capability module 806 can determine the default service 234 of FIG. 2 for accessing the peripheral device 206. More specifically, the capability module 806 can analyze the provider criterion 212 to determine the scenario not handled by the provider criterion 212.

For example, more than one of the service provider 232 can submit the device configuration 222 to the registration module 802. However, only one of the peripheral device 206 manufactured by Samsung™ can print in color. If the service request 210 seeks color printing by the peripheral device 206 manufactured by Xerox™, the capability module 806 can designate the device service 208 representing color printing by the peripheral device 206 manufactured by Samsung™ as the default service 234.

For a different example, the capability module 806 can determine the device service 208 for accessing the peripheral device 206. As discussed above, provider.meta-data.xml will specify the device service 208 provided by the peripheral device 206 for each of the service provider 232. Additionally, there can more than one of the service provider 232 registering the provider.meta-data.xml. The capability module 806 can parse each of the provider.meta-data.xml to determine what kind of the device service 208 is available.

The provider controlling platform system 100 can include a threshold module 808. The threshold module 808 generates the condition required to select the device service 208 for meeting or exceeding the service request 210. For example, the threshold module 808 can generate the selection threshold 220 based on the provider criterion 212, the device capability 214, or a combination thereof for executing the device service 208.

The threshold module 808 can generate the selection threshold 220 in a number of ways. For example, the provider criterion 212 can specify that the peripheral device 206 manufactured by Canon™ as unavailable from 2 AM to 3 AM every Sunday for maintenance. The threshold module 808 can generate the selection threshold 220 that includes the condition specified by the provider criterion 212.

For another example, the threshold module 808 can combine multiple numbers of the provider criterion 212, the device capability 214, or a combination thereof to generate the selection threshold 220. The threshold module 808 can combine by mixing and matching the provider criterion 212, the device capability 214, or a combination thereof specified by multiple numbers of the service provider 232.

For a specific example, multiple numbers of the service provider 232 can define each of the provider criterion 212. One of the provider criterion 212 can specify for printing documents with a file size less than one megabyte. Another of the provider criterion 212 can specify for printing documents with a file size greater than one megabyte. The threshold module 808 can generate the selection threshold 220 by combining both of the provider criterion 212 to meet the service request 210 requesting printing of documents with a file size less than one megabyte and a file size greater than one megabyte.

For a different example, one of the peripheral device 206 can include the device capability 214 of faxing documents. The other of the peripheral device 206 can include the device capability 214 of scanning documents. The threshold module 808 can combine the device capability 214 for both of the device service 208 to meet or exceed the service request 210.

It has been discovered the present invention provides the provider controlling platform system 100 to maximize the device service 208 available for meeting or exceeding the service request 210. The generation of the selection threshold 220 assures the sender of the service request 210 to receive the execution of the device service 208 best suited for the sender. Furthermore, the generation of the selection threshold 220 incentivizes the service provider 232 to define the provider criterion 212 and the device capability 214 best suited to meet or exceed the service request 210. Additionally, the combination of the provider criterion 212, the device capability 214, or a combination thereof from multiple numbers of the service provider 232 expands the ability of the provider controlling platform system 100 to meet or exceed the service request 210. The consumer of the device service 208 can be exposed to wider variety of device service 208 to meet the service request 210 made, thus, improving efficiency and productivity to maximize the device service 208.

The provider controlling platform system 100 can include a directory module 810. The directory module 810 generates a collection of the service provider 232 offered to provide the device service 208 for the provider controlling platform system 100. For example, the directory module 810 can generate the service listing 224 based on the provider criterion 212, the device capability 214, the peripheral device 206, or a combination thereof for disclosing the device service 208 available.

The directory module 810 can generate the service listing 224 in a number of ways. For example, the directory module 810 can generate the service listing 224 based on the device service 208 offered, such as scanning documents. For another example, the directory module 810 can generate the service listing 224 based on the manufacturer of the peripheral device 206.

For a different example, the directory module 810 can generate the service listing 224 based on the APIs provided by the OSGi framework. Some of the examples of the APIs are as follows:

```
//retrieved listing manager service from OSGi registry using spring-dm
IListingManagerService listingManagerService;
//tell listing manager service you want a listing service that returns
//the specified properties
List<IProperty> properties = new Vector<IProperty>( );
properties.add(IPropertyCategoryHolder.deviceProperties.DeviceSerialNumber);
...
IListingService deviceListingService =
listingManagerService.getService(IDevice.class.getName( ), properties);
//Listing Manager Service uses IProviderManagerService to retrieve best provider to
//service request. Client shall get pointer to service that is most suitable to satisfy
//there request. They can now use listing service to retrieve device information.
```

The provider controlling platform system 100 can include a discovery module 812. The discovery module 812 permits the client devices to introspect the device service 208 available on the provider controlling platform system 100. For example, the discovery module 812 can discover the device service 208 based on the device configuration 222 for selecting the device service 208. For a specific example, the discovery module 812 can include the client interface 302 of FIG. 3 for the user of the first device 102 to introspect the device service 208 available on the provider controlling platform system 100.

The discovery module 812 can discover the device service 208 in a number of ways. For example, the discovery module 812 can discover the device service 208 available based on the service listing 224 generated by the directory module 810. For another example, the discovery module 812 can discover the device service 208 based on the device configuration 222. More specifically, the discovery module 812 can discover the device service 208 based on device configuration 222 by utilizing the APIs provided by the OSGi framework. Some of the examples of the APIs are as follows:

```
//retrieve all discovery services from OSGi registry
ServiceReference [ ]serviceReferences =
bundleContext.getServiceReferences(IDeviceDiscoveryService.class.getName( ),
null);
//you would then retrieve actual service object using reference
...
//ui is created based on registered discovery services
//user selects discovery service it wants to use and
//configures it.
IDeviceDiscoveryService service = pms.getService(providerId, serviceId);
//configure discovery service through IParameter based on settings specified //by user.
//create task and schedule it.
```

For illustrative purposes, the provider controlling platform system 100 is shown with the discovery module 812 discovering the device service 208, although it is understood that the discovery module 812 can operate differently. For example, the discovery module 812 can conceal the selection process 202 of FIG. 2 for selecting the device service 208.

For a specific example, the discovery module 812 can conceal the selection process 202 by concealing the provider criterion 212 defined by the service provider 232 from the user of the first device 102. For another example, the discovery module 812 can conceal the selection process 202 by only revealing the device service 208 available, but concealing the type of the peripheral device 206 registered to the provider controlling platform system 100 from the user of the first device 102.

The provider controlling platform system 100 can include a platform module 814. The platform module 814 generates rules specific to the application environment 204 for selecting the device service 208. For example, the platform module 814 can generate the platform criterion 216 of FIG. 2 based on the application environment 204 for controlling the device service 208.

The platform module 814 includes an environment module 816. The environment module 816 can generate the platform criterion 216 in a number of ways. For example, the environment module 816 can generate the platform criterion 216 based on the OSGi framework. For another example, the environment module 816 can generate the platform criterion 216 based on the resources available on the host system, such as the second device 102. Resources for the host system can include the processing speed, memory size, storage size, or a combination thereof.

The platform module 814 includes an order module 818. For example, the order module 818 can generate the execution order 218 of FIG. 2 for controlling the device service 208. The OSGi framework can provide a specification that controls the usage of APIs. Furthermore, the OSGi framework can manage the lifecycle for the usage of the APIs and packaging of the APIs. The lifecycle is defined as the execution flow that represents the start of the API execution through the completion of API execution. The OSGi framework can set guidelines that restrict how the API execution can start, complete, or a combination thereof. Subsequently, the environment module 816 can generate the platform criterion 216 consistent to the OSGi framework.

The provider controlling platform system 100 can include a command module 820. The command module 820 generates the demand to the peripheral device 206 for executing the device service 208 to meet or exceed the service request 210. For example, the command module 820 can generate the service command 230 based on the selection threshold 220 meeting or exceeding the service request 210 for commanding the peripheral device 206 to execute the device service 208.

The command module 820 can generate the service command 230 in a number of ways. For example, the command module 820 can follow the logical sequence illustrated in FIG. 6. For a specific example, the command module 820 can generate the service command 230 based on the platform criterion 216 meeting or exceeding the service request 210 for overriding the provider criterion 212.

As illustrated in FIG. 2 and FIG. 4, if the platform criterion 216 is met, the command module 820 can generate the service command 230 to command the device service 208 designated under the platform criterion 216. For example, the platform criterion 216 can designate the peripheral device 206 manufactured by Samsung™ as the peripheral device 206 for color printing, because the peripheral device 206 for Samsung™ is the least resource intensive to the host system. Even if the service request 210 seeks the peripheral device 206 manufactured by Canon™ for color printing, the command module 820 can generate the service command 230 to command the peripheral device 206 manufactured by Samsung™ to meet the service request 210.

For another example, the command module 820 can generate the service command 230 based on the execution order 218, the platform criterion 216, or a combination thereof for controlling the service provider 232. The provider criterion 212 can restrict the order of activating the peripheral device 206. For example, the device service 208 can represent printing. More specifically, the provider criterion 212 can designate the execution of the device service 208 by the peripheral device 206 representing an MFP to be executed before the peripheral device 206 representing a printer. However, the MFP can be more resource intensive. The execution order 218 can designate the peripheral device 206 with less resource demand to be activated first to meet the service request 210 when the number of the service request 210 is at high volume.

For a different example, the command module 820 can generate the service command 230 based on the platform criterion 216 meeting or exceeding the service request 210, otherwise the service command 230 is generated based on the selection threshold 220 meeting or exceeding the service request 210 for commanding the peripheral device 206 to execute the device service 208. For example, as illustrated in FIG. 4, if the platform criterion 216 is not met, the command module 820 can generate based on the selection threshold 220 meeting the service request 210. For a specific example, the device capability 214 for the peripheral device 206 registered can be duplex printing. The service request 210 can be for duplex printing. The command module 820 can generate the service command 230 to command the peripheral device 206 to execute the device service 208 for duplex printing to meet the service request 210.

For a different example, the command module 820 can generate the service command 230 for executing the default service 234 based on the platform criterion 216, the selection threshold 220, or a combination thereof not meeting the service request 210. As illustrated in FIG. 4, the command module 820 can generate the default service 234 if the platform criterion 216 or the selection threshold 220 fails to meet the service request 210.

It has been discovered that the present invention provides the provider controlling platform system 100 with a robust architecture to meet or exceed the service request 210. By allowing the platform criterion 216 to override the provider criterion 212, the provider controlling platform system 100 can maximize the available resources for the application environment 204. The ability to select the peripheral device 206 based on the condition of the application environment 204 assists the provider controlling platform system 100 to efficiently meet or exceed the service request 210 thereby providing the robust architecture to execute the device service 208 best suited for the sender of the service request 210.

Furthermore, even if the platform criterion 216 or the provider criterion 212 fails to meet the service request 210, the default service 234 can be executed to respond to the service request 210. The robust architecture creates a seamless exchange between the consumer and the service provider 232 of the device service 208, eliminating inefficiency caused by failure to meet the service request 210.

The provider controlling platform system 100 can include a collection module 822. The collection module 822 collects the execution result for commanding the peripheral device 206 to execute the device service 208. For example, the collection module 822 can generate the collection criterion 226 of FIG. 2 based on the device configuration 222 for collecting the command result 228 of FIG. 2 for executing the service command 230.

The collection module 822 can generate the collection criterion 226 in a number of ways. For example, the collection module 822 can generate the collection criterion 226 based on the platform criterion 216, the provider criterion 212, the device capability 214, or a combination thereof. For a specific example, the collection criterion 226 can be based on the device capability 214. The device capability 214 can represent printing documents. The collection module 822 can generate the collection criterion 226 that defines the collection of the command result 228 for executing the device service 208 representing printing of documents.

For another example, the collection module 822 can generate the collection criterion 226 based on the device configuration 222. One of the peripheral device 206 can demand large amount of resource from the host system. The collection module 822 can generate the collection criterion 226 based on the device configuration 222 representing a particular resource requirement for executing the device service 208.

The collection module 822 can collect the command result 228 in a number of ways. For example, the collection module 822 can collect the command result 228 based on utilizing the APIs provided by the OSGi framework. Some of the examples of the APIs are as follows:

```
//retrieved collection service from OSGi registry using spring-dm
IDeviceDataCollectionService collectionService;
//configure collection service with properties you want collected and
//devices you want to collect from.
List<IProperty> properties = new Vector<IProperty>( );
List<IDevice> devices = new Vector<IDevice>( );
//this example only asks to collect alerts table
//more may be added
properties.add(IDeviceProperties.AlertTable);
//create runnable or schedulable task
ITask task = collectionService.createRunnableTask(devices, properties);
//run or schedule task using scheduler
```

For a specific example, the collection module 822 can run a scheduler to collect the command result 228. The scheduler is defined as an application that executes a software program based on a predefined time schedule.

For illustrative purposes, the provider controlling platform system 100 is shown with the registration module 802 registering the service provider 232, although it is understood that the registration module 802 can operate differently. For example, the registration module 802 can unregister service provider 232 for controlling the device service 208 available.

The registration module 802 can unregister the service provider 232 in a number of ways. For example, the registration module 802 can unregister the service provider 232 based on the platform criterion 216. More specifically, the platform criterion 216 can specify that the resource of the second device 106 may not support the device configuration 222 offered by the service provider 232. Subsequently, the registration module 802 can unregister the service provider 232 to secure sufficient resource for the second device 106.

For illustrative purposes, the provider controlling platform system 100 is shown with the criteria module 804 determining the provider criterion 212, although it is understood that the criteria module 804 can operate differently. For example, the criteria module 804 can update the provider criterion 212 for managing the device service 208.

The criteria module 804 can update the provider criterion 212 in a number of ways. For example, the service provider 232 can submit an updated version of the provider.metadata.xml. For another example, the criteria module 804 can update the provider criterion 212 based on the command result 228. More specifically, if the command module 820 generates the service command 230 to execute the default service 234, the provider criterion 212 currently available in the criteria module 804 may be insufficient to meet the service request 210. Subsequently, the criteria module 804 can update the provider criterion 212 by adding the default service 234 as one of the device service 208 defined in the provider criterion 212.

For illustrative purposes, the provider controlling platform system 100 is shown with the capability module 806 determining the device capability 214, although it is understood that the capability module 806 can operate differently. For example, the capability module 806 can update the device capability 214 for controlling the device service 208 available.

The capability module 806 can update the device capability 214 in a number of ways. For example, the service provider 232 can submit an updated version of the provider.metadata.xml. For another example, the capability module 806 can update the device capability 214 based on the device status 238 of FIG. 2 of the peripheral device 206. More specifically, the peripheral device 206 representing an MFP can be out of toner. The capability module 806 can update the device capability 214 of the peripheral device 206 by removing the device capability 214 representing printer based on the device status 238 of the peripheral device 206 from the service listing 224.

For illustrative purposes, the provider controlling platform system 100 is shown with the threshold module 808 generating the selection threshold 220 based on the provider criterion 212, the device capability 214, or a combination thereof, although it is understood that the threshold module 808 can operate differently. For example, the threshold module 808 can generate the selection threshold 220 based on the service listing 224 for selecting the device service 208. For a specific example, the service listing 224 can only list simplex printers. The threshold module 808 can generate the selection threshold 220 based on simplex printers as the peripheral device 206 available to meet or exceed the service request 210.

The physical transformation from generating the service command 230 based on the selection threshold 220 results in the commanding of the peripheral device 206 in the real world to execute the device service 208 to meet or exceed the service request 210. As a result, the peripheral device 206 executes the device service 208 that includes printing, faxing, scanning, displaying, or a combination thereof. The commanding of the peripheral device 206 to execute the device service 208 can change the device status 238. The change in the device status 238 can change the availability of the peripheral device 206, thus, impacting the provider controller platform system 100 executing the selection process 202 for selecting the device service 208 for meeting or exceeding the service request 210.

FIG. 7 can represent the hardware block diagram for implementing the provider controlling platform system 100 on the second device 106 of FIG. 7. The second device 106 can include a specialized function unit to implement the provider controlling platform system 100 on the hardware available of the second device 106. Each of the modules in the second device 106 can represent a hardware block for implementing the provider controlling platform system 100.

FIG. 7 can represent the software block diagram for implementing the provider controlling platform system 100 on the second device 106. The first software 726 of FIG. 7 of the second device 106 can include the provider controlling platform system 100. For example, the first software 726 can include the registration module (802) 502, the grouping module 504, the visibility module 506, the monitoring module 508, the gatekeeper module 512, the request processor module 518, the authorization module 520, and the execution module 522.

The first control unit 712 of FIG. 7 can execute the first software 726 for the registration module 802 for registering the service provider 232. The first control unit 712 can execute the first software 726 for the criteria module 804 for determining the provider criterion 212. The first control unit 712 can execute the first software 726 for the capability module 806 for determining the device capability 214.

The first control unit 712 can execute the first software 726 for the threshold module 808 for generating the selection threshold 220. The first control unit 712 can execute the first software 726 for the directory module 810 for generating the service listing 224. The first control unit 712 can execute the first software 726 for the discovery module 812 for discovering the device service 208.

The first control unit 712 can execute the first software 726 for the platform module 814 for generating the platform criterion 216. The first control unit 712 can execute the first software 726 for the command module 820 for generating the service command 230. The first control unit 712 can execute the first software 726 for the collection module 822 for generating the collection criterion 226.

It has been discovered that the present invention provides the provider controlling platform system 100 fully customize the device service 208 available on the provider controlling platform system 100 to adapt to the ever changing nature of the service request 210. The device service 208 can be replaced, expanded, or a combination thereof by the service provider 232 to exceed the service request 210. Additionally, the robust architecture of the provider controlling platform system 100 creates a fault proof framework that can respond to various demands made by the service request 210 with little or no down time for meeting or exceeding the consumer demands. As a result, the flexibility to fully customize the present invention improves efficiency and productivity by providing the device service 208 that can meet or exceed the service request 210.

Data generated in one module can be used by another module without being directly coupled to each other. For example, the threshold module 808 can receive the provider criterion 212 from the criteria module 804.

Figure 9:
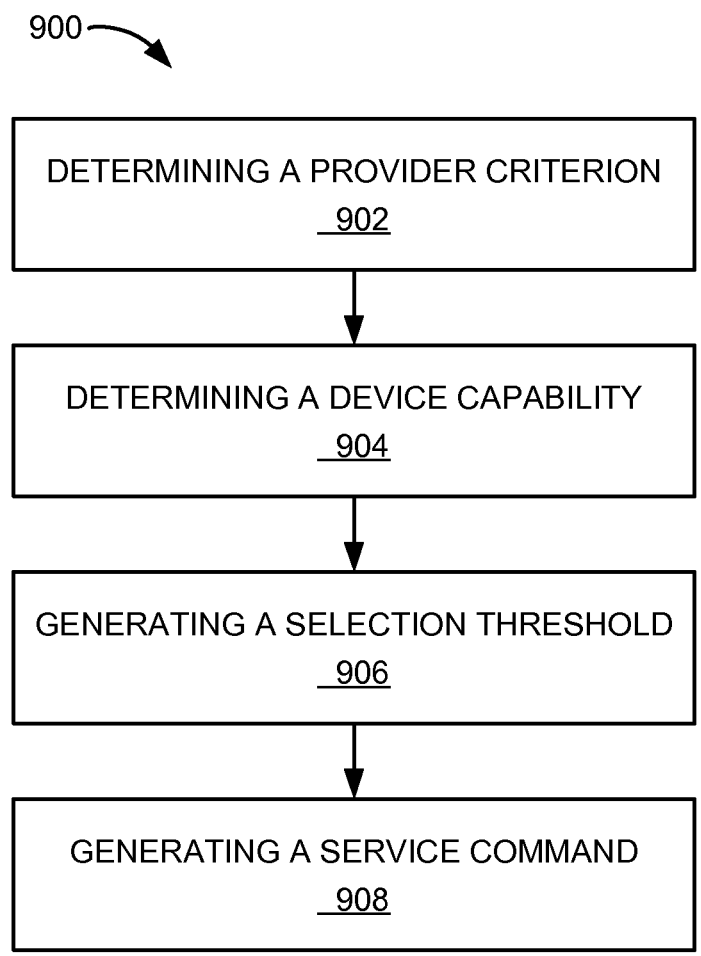
FIG. 9 is a flow chart of method of operation of the platform system 100 in a further embodiment of the present invention.

Referring now to FIG. 9, therein is shown a flow chart of method 900 of operation of the provider controlling platform system 100 in a further embodiment of the present invention. The method 900 includes: determining a provider criterion for selecting a service provider in a block 902; determining a device capability for selecting a device service for a peripheral device in a block 904; generating a selection threshold based on the provider criterion, the device capability, or a combination thereof for executing the device service in a block 906; and generating a service command based on the selection threshold meeting or exceeding a service request for commanding the peripheral device to execute the device service in a block 908.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a provider controlling platform system comprising:
   determining a provider criterion for selecting a service provider;
   determining a device capability for selecting a device service for a peripheral device;
   executing a selection process for revealing the device service but concealing a type of the peripheral device registered from a user;
   generating a platform criterion based on an application environment for controlling the device service;
   generating a selection threshold based on the provider criterion, the device capability, or a combination thereof for executing the device service; and
   generating a service command with a control unit based on considering the selection process including the selection threshold and the platform criterion, the service command generated if the selection threshold or the platform criterion meets or exceeds a service request for overriding the provider criterion for commanding the peripheral device to execute the device service.

2. The method as claimed in claim 1 further comprising:
   determining a default service for accessing the peripheral device; and
   wherein:
   generating the service command includes generating the service command for executing the default service based on the service request exceeding the selection threshold.

3. The method as claimed in claim 1 further comprising:
   determining a default service for accessing the peripheral device; and
   wherein:
   generating the service command includes generating the service command for executing the default service based on the service request exceeding the platform criterion.

4. The method as claimed in claim 1 further comprising:
   generating an execution order for controlling the device service; and
   wherein:
   generating the service command includes generating the service command based on the execution order, the platform criterion, or a combination thereof for controlling the service provider.

5. A method of operation of a provider controlling platform system comprising:
   determining a provider criterion for selecting a service provider;
   determining a device capability for selecting a device service for a peripheral device;
   executing a selection process for revealing the device service but concealing a type of the peripheral device registered from a user;
   generating a platform criterion based on an application environment for controlling the device service;
   generating a selection threshold based on the provider criterion, the device capability, or a combination thereof for executing the device service; and
   generating a service command with a control unit based on considering the selection process including the selection threshold and the platform criterion, the service command generated if the selection threshold or the platform criterion meets or exceeds a service request for overriding the provider criterion for commanding the peripheral device to execute the device service, otherwise a default service is executed.

6. The method as claimed in claim 5 wherein generating the selection threshold includes concealing the selection process for selecting the device service.

7. The method as claimed in claim 5 further comprising:
   receiving a device configuration for registering the service provider;
   discovering the device service based on the device configuration for selecting the device service; and
   generating a collection criterion based on the device configuration for collecting a command result for executing the service command.

8. The method as claimed in claim 5 further comprising:
   updating the provider criterion for managing the device service;
   updating the device capability for controlling the device service available; and
   generating a service listing based on the provider criterion, the device capability, or combination thereof for disclosing the device service available.

9. The method as claimed in claim 5 further comprising unregistering the service provider for controlling the device service available.

10. A provider controlling platform system comprising:
    a communication interface [[configured to receive]] receiving a service request; and
    a control unit, including a processor and coupled to the communication unit:
       determining a provider criterion for selecting a service provider,
       determining a device capability for selecting a device service for a peripheral device,
       executing a selection process for revealing the device service but concealing a type of the peripheral device registered from a user,
       generating a platform criterion based on an application environment for controlling the device service, generating a selection threshold based on the provider criterion, the device capability, or a combination thereof for executing the device service, and generating a service command based on considering the selection process including the selection threshold and the platform criterion, the service command generated if the selection threshold or the platform criterion meets or exceeds the service request for overriding the provider criterion for commanding the peripheral device to execute the device service.

11. The system as claimed in claim 10 wherein the control unit:

determining a default service for accessing the peripheral device; and generating the service command for executing the default service based on the service request exceeding the selection threshold.

12. The system as claimed in claim 10 wherein the control unit:

determining a default service for accessing the peripheral device; and generating the service command for executing the default service based on the service request exceeding the platform criterion.

13. The system as claimed in claim 10 wherein the control unit:

generating an execution order for controlling the device service; and generating the service command based on the execution order, the platform criterion, or a combination thereof for controlling the service provider.

14. The system as claimed in claim 10 wherein the control unit:

generating a platform criterion based on an application environment for controlling the device service;

generating a selection threshold based on the provider criterion, the device capability, or a combination thereof for executing the device service; and generating a service command based on the platform criterion meeting or exceeding the service request, otherwise the service command is generated based on the selection threshold meeting or exceeding the service request for commanding the peripheral device to execute the device service.

15. The system as claimed in claim 14 wherein the control unit concealing the selection process for selecting the device service.

16. The system as claimed in claim 14 wherein the control unit:

receiving a device configuration for registering the service provider;

discovering the device service based on the device configuration for selecting the device service; and generating a collection criterion based on the device configuration for collecting a command result for executing the service command.

17. The system as claimed in claim 14 wherein the control unit:

updating the provider criterion for managing the device service;

updating the device capability for controlling the device service available; and generating a service listing based on the provider criterion, the device capability, or combination thereof for disclosing the device service available.

18. The system as claimed in claim 14 wherein the control unit unregistering the service provider for controlling the device service available.

* * * * *